United States Patent [19]
Eguchi et al.

[11] Patent Number: 6,087,803
[45] Date of Patent: Jul. 11, 2000

[54] BATTERY PACK, ELECTRONIC EQUIPMENT SYSTEM AND METHOD OF DETECTING LOADING OF BATTERY PACK TECHNICAL FIELD

[75] Inventors: Yasuhito Eguchi, Kanagawa; Kazuhiko Yoshida, Tokyo, both of Japan

[73] Assignee: Sony Corporation, Tokyo, Japan

[21] Appl. No.: 09/230,328

[22] PCT Filed: May 25, 1998

[86] PCT No.: PCT/JP98/02279

§ 371 Date: Jul. 6, 1999

§ 102(e) Date: Jul. 6, 1999

[87] PCT Pub. No.: WO98/53516

PCT Pub. Date: Nov. 26, 1998

[30] Foreign Application Priority Data

May 23, 1997 [JP] Japan .................................. P9-133887

[51] Int. Cl.$^7$ .................................................. H01M 10/46
[52] U.S. Cl. ................................... 320/106; 320/DIG. 12
[58] Field of Search .................................. 320/110, 106, 320/112, 132, 165, DIG. 12, DIG. 21

[56] References Cited

U.S. PATENT DOCUMENTS 5,619,117  4/1997  Koenck .
5,625,237  4/1997  Saeki et al. .................. 320/DIG. 12 X
5,629,604  5/1997  Sengupta et al. .
5,644,210  7/1997  Hwang ........................ 320/DIG. 12 X
5,861,812  1/1999  Mitchell et al. ............. 320/DIG. 12 X
5,870,025  2/1999  Hinohara .................................. 340/636

FOREIGN PATENT DOCUMENTS 6-124146  5/1994  Japan .
8-19184   1/1996  Japan .

Primary Examiner—Edward H. Tso
Attorney, Agent, or Firm—Hill & Simpson

[57] ABSTRACT

A battery pack 2 is detachably loaded with respect to an electronic equipment 1 through an electric connecting portion 3 to thereby deliver power. A CPU 2f of the battery pack 2 detects signal states of communication lines by using communication lines, e.g., data lines 3h, 3f and clock lines 3i, 3g for informing information between the battery pack 2 and the electronic equipment 1, whereby the battery pack 2 detects whether the battery pack is in the state electrically connected to the connecting portion of the electronic equipment 1 or in the state electrically detached from the connecting portion of the electronic equipment 1. Thus, the number of connecting terminals used in electrically connecting the battery pack with respect to the electronic equipment is reduced. As a result, miniaturization can be realized and there can result less unsatisfactory terminal contact.

18 Claims, 5 Drawing Sheets

BATTERY PACK, ELECTRONIC EQUIPMENT SYSTEM AND METHOD OF DETECTING LOADING OF BATTERY PACK TECHNICAL FIELD

TECHNICAL FIELD

This invention relates to a battery pack to be loaded into electronic equipment, e.g., a portable personal computer, to supply power, and also relates to an electronic equipment system having a battery pack and electronic equipment, as well as to a loading detecting method for the battery pack, which detects whether or not the battery pack is loaded in the electronic equipment.

BACKGROUND ART

Electronic equipment is being increasingly provided as portable electronic equipment, e.g., the so-called notebook-type personal computers, information terminals, video tape recorders, sound recorders and/or portable telephones, etc. and there are, e.g., electric bicycles provided with a motor for power assist, etc.

Such electronic equipment is adapted so that a battery pack (also called a battery package) is loaded into the equipment for the purpose of supplying power from the battery pack for operating the equipment.

An explanation will be given by taking the example of a notebook personal computer and battery pack therefor as an example of the prior art.

The function to detect whether or not a conventional battery pack is electrically connected to the body of the notebook personal computer be explained with reference to FIG. 1.

FIG. 1 shows a portion of the circuit configuration of an interface of a notebook personal computer 1000 and a battery pack 1002.

The notebook personal computer 1000 and the battery pack 1002 are detachably connected by a connecting portion 1003. A battery plus terminal (Batt+terminal) 1003*a* and a battery minus terminal (Batt−terminal) 1003*e* are connecting portions for power supply of the notebook personal computer 1000 and the battery pack 1002. The notebook personal computer 1000 can collect respective information of the battery pack 1002 such as charge/discharge current, battery voltage and capacity, etc. through a communication line from the battery pack 1002.

In FIG. 1, there is shown a communication system of the two wire type having a data line and a clock line, and the data line and the clock line of the notebook personal computer 1000 and the battery pack 1002 are respectively connected by a data terminal 1003*b* and a clock terminal 1003*c*. A B-IN terminal 1003*d* is a connecting portion of a detection line 1002*e* relating to the loading state of the battery pack 1002 in the body of the notebook personal computer 1000.

Reference numeral 1001*a* indicates a 5V power supply line of the notebook personal computer 1000, reference numeral 1001*f* indicates a communication LSI (Large Scale Integrated) Circuit of the notebook personal computer 1000, reference numeral 1001*b* indicates a pull-up resistor Rn 1 (e.g., 4.7 kΩ) of the data line, and reference numeral 1001*c* indicates a pull-up resistor Rn2 (e.g., 4.7 kΩ) of the clock line. Reference numeral 1001*d* indicates a pull-down resistor Rn3 (e.g., 10 kΩ) for allowing the loading state detection line 1002*e* of the battery pack 1002 to be at an L level (low).

Reference numeral 1002*a* indicates a 5V power supply line of the battery pack 1002, and reference numeral 1002*f* indicates a CPU (Central Processing Unit) for charge/discharge control of the battery pack 1002, communication with the notebook personal computer 1000 and various calculations. Reference numeral 1002*d* indicates a pull-up resistor Rp3 (e.g., 1 MΩ) of the loading state detection line of the battery pack 1002.

Let us consider the case where an AC adapter (A.C. current adapter) is not connected to the notebook personal computer 1000 and the 5V power supply line 1001*a* of the notebook personal computer 1000 has a high impedance. Before loading of the battery pack 1002 is detected, the CPU 1002*f* of the battery pack 1002 does not deliver power to the notebook personal computer 1000. When the battery pack 1002 is loaded, the signal level of the loading state detection line 1002*e* of the battery pack 1002 shifts from the H level (high) to the L level (low) by a resistor (Rn3) 1001*d* of the notebook personal computer 1000, and the CPU 1002*f* thus detects loading of the battery pack 1002. When such loading is detected, the battery pack 1002 delivers power to the notebook personal computer 1000.

In the case where the battery pack 1002 is taken out of the notebook personal computer 1000, the loading state detection line 1002*e* is disconnected from the pull-down resistor (Rn3) 1001*d*, and its signal level shifts from the L level to the H level by the pull-up resistor (Rp3) 1002*d*.

In the case where, for the purpose of reducing current consumption, the battery pack 1002 is not loaded into the notebook personal computer 1000, or in the case where the notebook personal computer 1000 is in a sleep state even if the battery is loaded, power supply to a portion of the circuit within the battery pack 1002 is interrupted to reduce current consumption.

The charge/discharge operation of the battery pack 1002 is effected by the loading state, when the battery is not loaded, the battery pack 1002 inhibits the charge/discharge operation, but when it is loaded, it enables charge/discharge operation if the battery pack 1002 in a normal state.

Detection that the notebook personal computer 1000 is in a sleep state during loading is carried out by allowing the CPU 1002*f* of the battery pack 1002 to detect that the signal level of the communication line is not changed for a predetermined time or longer.

The battery pack 1002 serves to apply a latch for overcurrent protection so that charge/discharge operation is disabled. However, in the case where overcurrent is detected, the latch for overcurrent protection is released when the battery pack 1002 is taken out from the notebook personal computer 1000.

Further, the loaded battery pack 1002 does not deliver power to the notebook personal computer 1000 until it recognizes that the battery pack 1002 has been loaded (it is in the chargeable/dischargeable state). In addition, in the case where the battery pack 1002 is taken out, it does not inhibit charge/discharge operation until it recognizes that it is taken out except for an extraordinary state such as overcurrent, overdischarge or overcharge, etc.

For the above reasons, the function to detect the electrical loading state with respect to the connecting portion 1003 of the battery pack 1002 is important.

Meanwhile, as shown in FIG. 1, the connecting portion 1003 between the notebook personal computer 1000 and the battery pack 1002 requires five terminals in total for the battery plus terminal 1003*a*, data terminal 1003*b*, clock terminal 1003*c*, B-IN terminal 1003*d* and the battery minus terminal 1003*e*. Accordingly, in the case where the battery pack 1002 is connected by the connecting portion 1003 with respect to the notebook personal computer 1000, unless these five terminals are electrically securely connected, it is impossible to adequately deliver power to the notebook personal computer 1000 from the battery pack 1002.

If the number of these terminals of the connecting portion 1003 can be reduced, particularly if the B-IN terminal 1003d can be eliminated, the number of output terminals at the connecting portion 1003 is reduced. Thus, the battery pack 1002 can be more reliably electrically connected with respect to the notebook personal computer 1000, and miniaturization of the connecting portion can be realized and there can result less unsatisfactory terminal contact.

SUMMARY OF THE INVENTION

This invention has been made in view of the above-described problems, and its object is to provide a battery pack, an electronic equipment system and a method of detecting loading of the battery pack such that the number of connecting terminals used in electrically connecting the battery pack with respect to the electronic equipment is reduced so that miniaturization can be realized and there can result less unsatisfactory terminal contact.

In order to solve the problems as described above, this invention is directed to the configuration in which the battery pack is detachably loaded through an electric connecting portion to thereby deliver power, wherein the battery pack detects, by using a communication line for carrying out transmission/reception of information between the battery pack and the electronic equipment, whether the battery pack is in the state electrically connected to the connecting portion of the electronic equipment or the battery pack is in the state electrically detached from the connecting portion of the electronic equipment.

In this invention, the communication line for transmitting information between the battery pack and the electronic equipment is utilized. Namely, the battery pack can detect, on the basis of the state of the signal of this communication line, whether the battery pack is in the state electrically connected to the connecting portion of the electronic equipment or the battery pack is in the state electrically detached from the connecting portion of the electronic equipment.

In a more practical sense, as the communication line, there are mentioned a data line for carrying out transmission/reception of data between the battery pack and the electronic equipment and a clock line supplied with a clock signal from the electronic equipment. In this case, it is possible to detect, on the basis of a change of the signal level of the clock line at the time of a first state where the electronic equipment is supplied with power and communication is not carried out between the battery pack and the electronic equipment, a change of the signal level of the data line or the clock line at the time of a second state where the electronic equipment is supplied with power and communication is being carried out between the battery pack and the electronic equipment and a change of the signal level of the data line or the clock line at the time of a third state where the electronic equipment is not supplied with power, whether the battery pack is in the state electrically connected to the connecting portion of the electronic equipment or in the state electrically detached from the connecting portion of the electronic equipment.

Thus, the number of terminals for detection of loading of the battery pack which were required separately in the prior art can be reduced. Accordingly, miniaturization can be realized and there can result less unsatisfactory contact of terminal.

DETAILED DESCRIPTION OF THE INVENTION

Preferred embodiments of this invention will now be described in detail in accordance with the attached drawings.

Since the embodiments described below are preferred practical examples of this invention, various technical limitations are found in these embodiments. However, the scope of this invention is not limited to these examples as long as there is no description to the effect that this invention is particularly limited in the following explanation.

Figure 1:
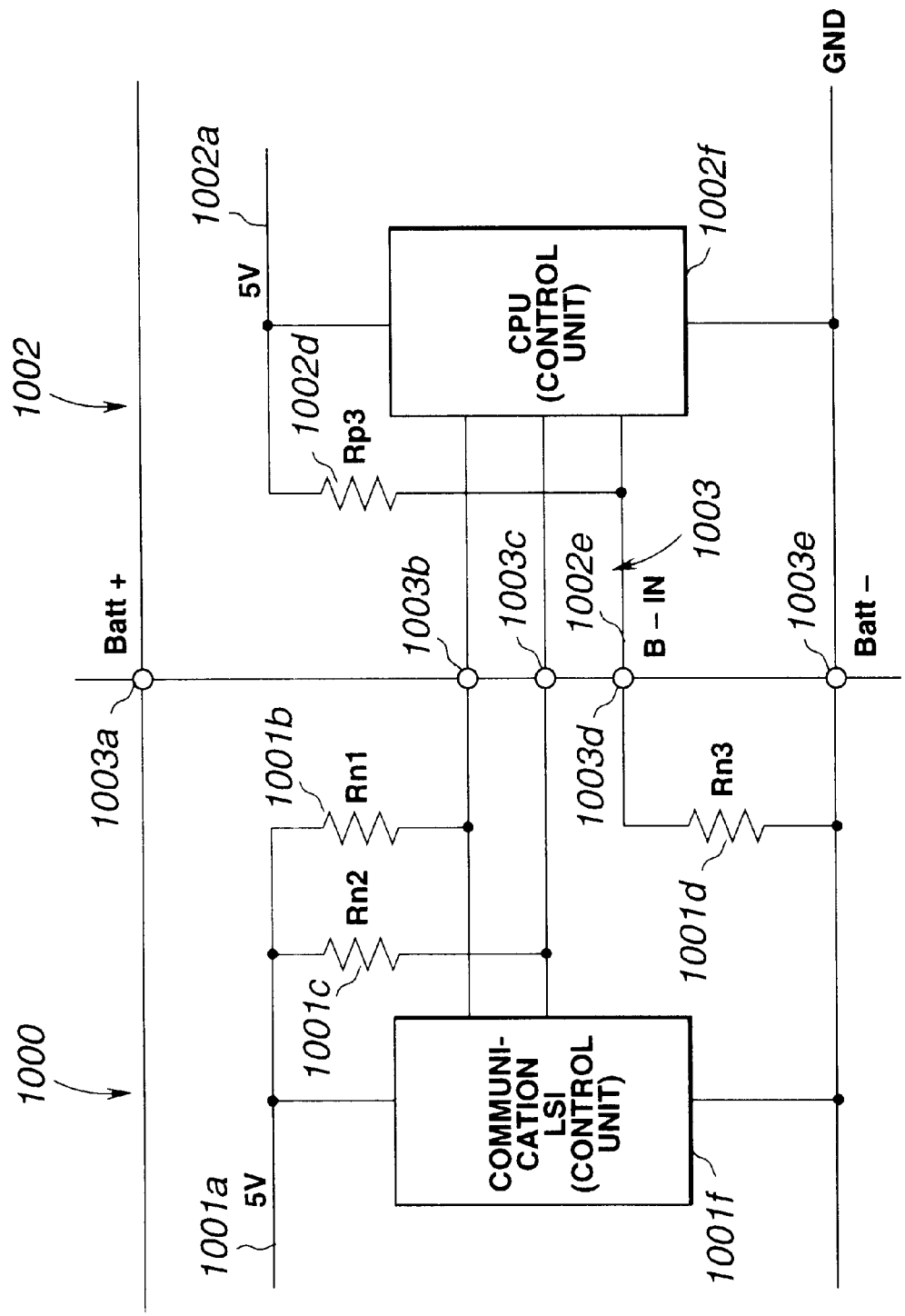
FIG. 1 is an electrical diagram showing an example of a conventional electronic apparatus.
Figure 2:
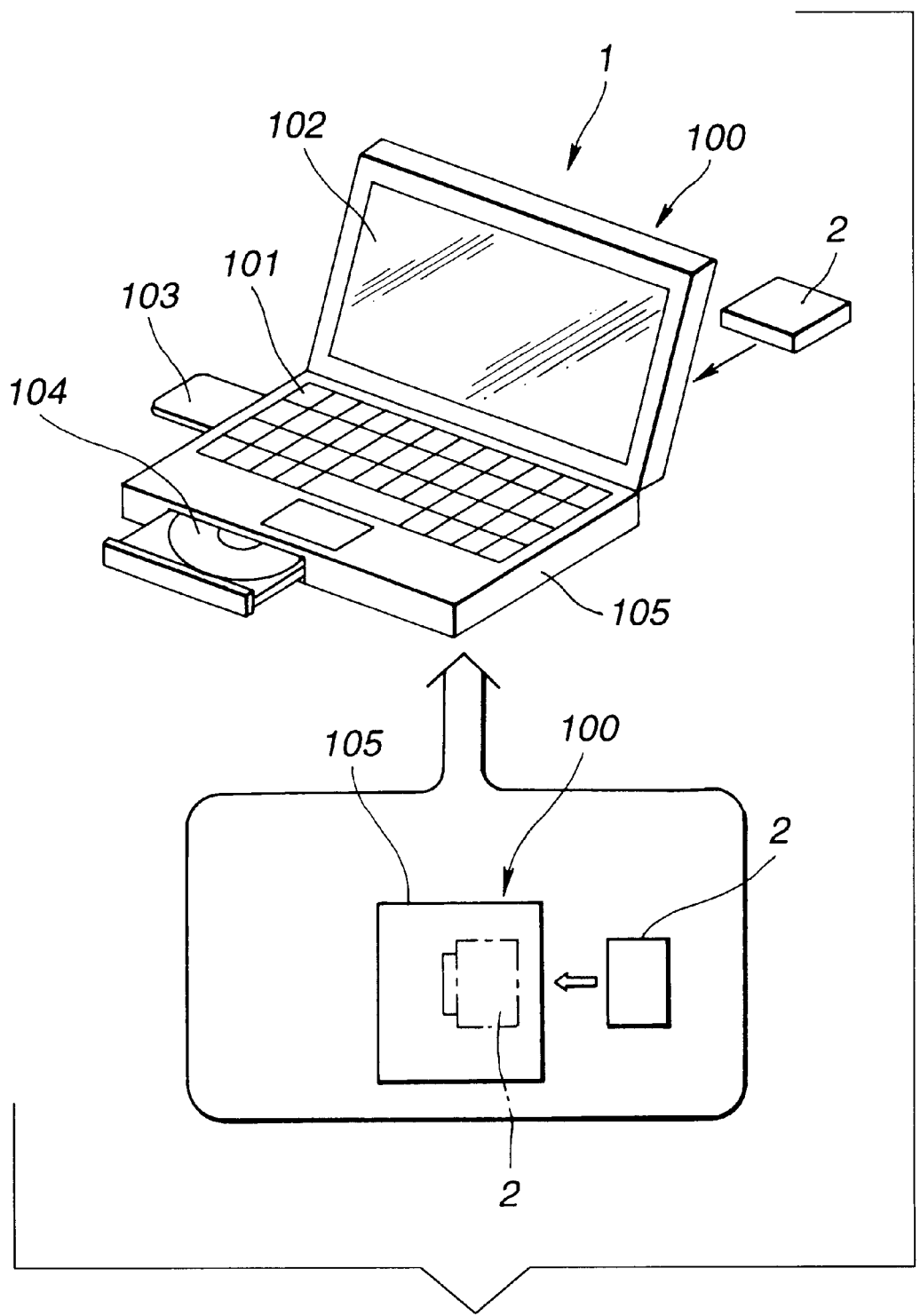
FIG. 2 is a perspective view showing an example applied to a notebook personal computer as an embodiment of a battery pack and electronic equipment of this invention.

FIG. 2 shows, as an embodiment of this invention, an example in which this invention is applied to a notebook type personal computer 1 and a battery pack 2. A body 105 of this notebook personal computer 1 includes a key board 101, a display 102, a slot 103 for a PC card, and a drive 104 for a CD-ROM (Read Only Memory utilizing compact disc), etc.

The battery 2 is detachably loaded into the body 105 so that it can be electrically connected thereto though the electric connecting portion 3. This battery pack 2 serves to deliver power for operation to the notebook personal computer 1 and is called a battery package. As an additional battery, e.g., a secondary battery, a lithium ion secondary battery may be used.

It is to be noted that, as the battery pack 2, a secondary battery or other kind of battery, e.g., lithium ion secondary battery, lead storage battery (the type used in an automotive vehicle), Ni—Cd battery (Nickel-Cadmium battery), Ni-hydrogen battery (Nickel-hydrogen battery), Ni—Zn battery (Nickel Zinc storage battery), polymer battery, Zn-air battery (Zinc-air battery), etc. may be employed.

Figure 3:
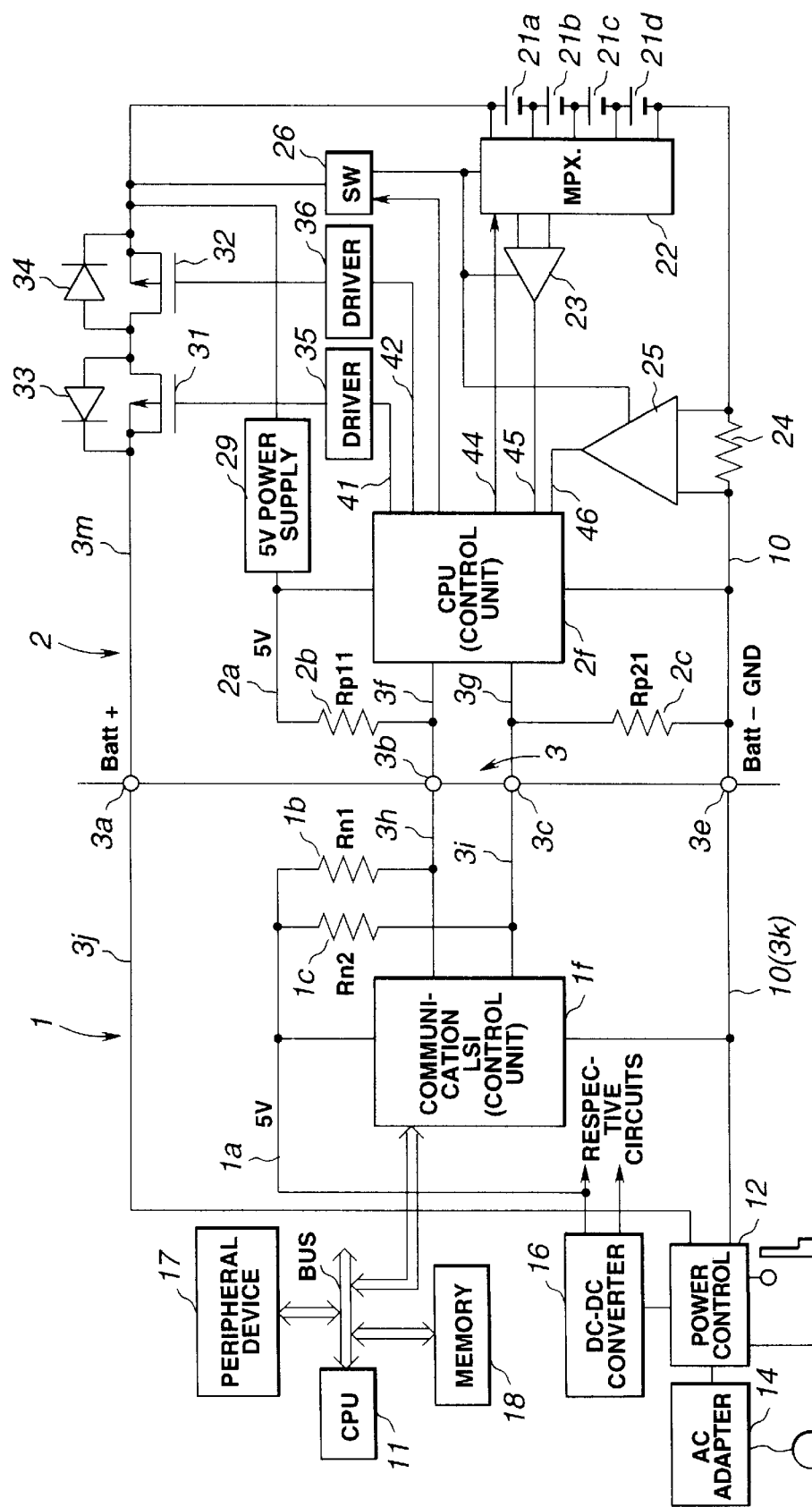
FIG. 3 is an electrical diagram showing a connection example of a battery pack and its electric connecting portion in the notebook personal computer of FIG. 2.

FIG. 3 shows the state where the battery pack 2 is connected to the notebook personal computer 1 though the connecting portion 3 in the embodiment of this invention.

The notebook personal computer 1 shown in FIG. 3 is the system in which only one AC adapter (A.C. power adapter) or the battery pack 2 can be loaded.

The notebook personal computer 1 includes a communication circuit LSI (Large Scale Integrated Circuit) (called a communication control unit as occasion may demand) 1f, and two pull-up resistors including a pull-up resistor (Rn1) 1b and a pull-up resistor (Rn2) 1c, etc. The communication circuit LSI 1f is connected between, e.g., a power supply line 1a of 5V and a ground line (GND) 10, and one respective end of two pull-up resistors (Rn1) 1b and (Rn2) 1c are connected to the power supply line 1a of 5V.

The other end of the pull-up resistor (Rn1) 1b is connected to a data line 3h of the communication LSI 1f, and the other end of the pull-up resistor (Rn2) 1c is connected to a clock line 3i of the communication LSI 1f. The data line 3h and the clock line 3i are respectively connected to a data terminal 3b and a clock terminal 3c of the connecting portion 3a. Battery lines 3j and 3k of the notebook personal computer 1 side are respectively connected to a battery plus terminal (Batt+ terminal) 3a and a battery minus terminal (Batt−terminal) 3e. In this example, the battery line 3k connected to the battery minus terminal (Batt−terminal) 3e serves as the ground line (GND) 10.

Moreover, at the notebook personal computer 1, various peripheral devices 17, and memory 18 such as ROM (Read Only Memory) and RAM (Random Access Memory), etc. are connected to a bus line BUS of the main CPU (Central Processing Unit), and the communication LSI 1f is connected to this bus line BUS. A power switch 13 is provided at a power control circuit 12 so that power ON/OFF control is carried out, and is supplied with commercial AC power from a power supply plug 15 through an AC adapter 14 so that power from the battery pack 2 is delivered through the battery lines 3j and 3k. In addition, charge current supply to the battery pack 2 is carried out though the battery lines 3j and 3k.

On one hand, the battery pack 2 includes a CPU (Central Processing Unit) 2f serving as a control unit, a single pull-up resistor (Rp11) 2b, and a pull-down resistor (Rp21) 2c. The pull-up resistor 2b is connected between a data line 3f of the CPU 2f and a power supply line 2a of 5V. A data line 3f and a clock line 3g of the CPU 2f can be respectively connected to the data terminal 3b and the clock terminal 3c of the connecting portion 3a. The data line 3f is connected to the other end of the pull-up resistor 2b, the clock line 3g is connected to one end of the pull-down resistor 2c, and the other end of the pull-down resistor 2c is connected to the ground line 10.

Moreover, a battery cell group composed of, e.g., four battery cells 21a, 21b, 21c and 21d connected in series is accommodated within the battery pack 2. The plus side of this battery cell group is connected to the battery plus terminal (Baa+terminal) 3a for external connection through a switching element, and the minus side thereof is connected to the battery minus terminal (Batt−terminal) 3e for external connection. In order to measure voltages of respective battery cells 21a, 21b, 21c and 21d of the group of battery cells, there are provided a multiplexer (MPX) 22 and an operational amplifier 23. When a battery cell select control signal from the CPU (control unit) 2f is sent to the multiplexer 22 through a control line 44, the multiplexer 22 selects any one of the four battery cells 21a, 21b, 21c and 21d to send its terminal voltage to the operational amplifier 23. Output from this operational amplifier 23 is sent to the CPU 2f though a voltage measurement signal line 45, and is caused to undergo A/D (Analog/Digital) conversion within the CPU 2f. Thus, the battery cell terminal voltage is taken thereinto as a digital value. A resistor 24 for current measurement is inserted and connected at, e.g., the minus side of the battery cell group. A voltage corresponding to current value flowing in this resistor 24 is detected by an operational amplifier 25, and is sent to the CPU 2f through a current measurement signal line 46. The voltage thus obtained is caused to undergo A/D (Analog/Digital) conversion within the CPU 2f, and current value thus measured is taken as a digital value. The multiplexer 22 and the operational amplifiers 23 and 25 are supplied with power through a power saving switch 26 from the plus side of the battery cell group. This switch 26 is subjected to ON/OFF control by a power saving control signal delivered through a power saving control line 43 from the CPU 2f. Moreover, a regulator circuit 29 for 5V power supply is connected to the plus side of the battery cell group, and the output from the 5V power regulator circuit 29 is delivered to the power supply line 2a of 5V.

Further, a FET 31 serving as a switching element for the Charge operation and a FET 32 serving as a switching element for the Discharge operation are inserted and connected in series between the battery plus terminal (Batt+ terminal) 3a of the battery pack 2 and the plus side of the battery cell group, and diodes 33 and 34 are respectively connected in parallel with these FETs 31 and 32. The FET 31 for charge operation is caused to undergo ON/OFF control by a driver 35. This driver 35 is driven by a control signal delivered through a charge control line 41 from the CPU 2f. On the other hand, the discharge FET 32 is caused to undergo ON/OFF control by a driver 36, and this driver 36, is driven by a control signal delivered through a discharge control line 42 from the CPU 2f.

In FIG. 3, the impedance of the 5V power supply line 1a is caused to be high, the data line 3f of the battery pack 2 is pulled up by the pull-up resistor 2b (e.g., 1 MΩ) so that there results a potential on the 5V power supply line 2a of the battery pack 2, and the clock line is pulled down by the pull-down resistor 2c (e.g., 10 MΩ) so that there results a potential on the ground line 10.

Namely, in this example, when an example of respective resistor values is taken, the pull-up resistor 1b of the notebook personal computer 1 is caused to be 4.7 kΩ, the pull-up resistor 1c thereof is caused to be 4.7 kΩ, the pull-up resistor 2b of the battery pack 2 is caused to be 1 MΩ, and the pull-down resistor 2c is caused to be 10 MΩ.

This notebook personal computer 1 is configured so that only one AC adapter or battery pack can be loaded and the 5V power supply line 1a has high impedance. In this case, the state where the battery pack 2 is electrically detached from the connecting portion 3 and the computer is operative by power supply from the AC adapter 14 is assumed. In the notebook personal computer 1 in such a state, e.g., the body 105 of FIG. 2 is in a sleep state and data terminal 3b and clock terminal 3c of the communication LSI 1f are held at 5V of the 5V power supply line 1a of high impedance as described above and so is in a communication standby state.

Namely, since the data line 3h which is pulled up by the pull-up resistor 1b and the clock line 3i which is pulled up by the pull-up resistor 1c are held at 5V, when the battery pack 2 is inserted so that it is electrically connected by the connecting portion 3, signal level of the pulled up data line 3h is not changed, remaining at the H level (High level), but the signal level of the pulled down clock line 3i changes from the L level (Low level) to the H level. By detecting this level change by the clock terminal 3g of the CPU 2f of the battery pack 2, the battery pack 2 detects the insertion state into the notebook personal computer 1.

In the notebook personal computer 1 in which the battery pack 2 is detached and is operative by the AC adapter 14, in the case where synchronous communication of, e.g., data of 8 bits is carried out at speed (rate) of 9600 bps in the communication operating state, since communication data signals appear on both the data line 3h and the clock line 3i, their signal levels change from the H level to the L level, or from the L level to the H level.

In view of the above, when the battery pack 2 is electrically inserted into the connecting portion 3 of the notebook personal computer, the signal level is changed between H/L in accordance with communication data appears on the data line 3h or the clock line 3i. By detecting the presence/absence of signal level change between H/L, it is possible to detect that the battery pack 2 has been loaded into the connecting portion 3. In this case, where attention is paid only to the signal level, the falling or rising edge when the signal level of the data line 3h changes from the H level to the L level or the clock line 3i changes from the L level to the H level is detected at the data terminal 3f or the clock terminal 3g of the CPU 2f of the battery pack 2, thereby making it possible to detect that the battery pack 2 has been electrically inserted into the connecting portion 3.

In the case where both the battery pack 2 and the AC adapter 14 are detached from the notebook personal computer 1, the 5V power supply line 1a of the notebook personal computer 1 is not held at 5V. When the battery pack 2 is inserted into the notebook personal computer 1, the 5V power supply line 2a and ground line 10 of the battery pack 2 are electrically connected through the pull-up resistor 2b, pull-up resistor 1b, pull-up resistor 1c and the pull-down resistor 2c. For this reason, the voltage level on the data line 3f of the battery pack 2 is expressed as follows.

$$(4.7\ k\Omega + 4.7\ k\Omega + 10\ M\Omega) \times 5/(1\ M\Omega + 4.7\ k\Omega \pm 4.7\ k\Omega + 10\ M\Omega)V$$

The voltage level of the clock line 3g is expressed as 10 MΩ×5/(1 MΩ+4.7 kΩ+4.7 kΩ+10 MΩ)V. By insertion of the battery pack 2, the signal level of the data line 3f is not changed in the state remaining at the H level, and signal level of the clock line 3g changes from the L level to the H level. Accordingly, this level change is detected by the clock terminal 3g of the CPU 2f to thereby detect insertion of the battery pack 2.

When the battery pack 2 is taken out of the notebook personal computer 1, since the signal level of the data line 3f of the battery pack 2 is pulled up, it is caused to be at the H level, and since the signal level of the clock line 3g is pulled down, it is caused to be at the L level. In view of this, if the signal levels of the data line 3f and the clock line 3g of the battery pack 2 are respectively at the H level and the L level for a predetermined time or longer (e.g., 1 sec or more), it is judged that the battery pack 2 has been detached from the notebook personal computer 1.

As described above, the data line and clock line serving as the communication line are used to judge the electrical insertion or taking-out with respect to the notebook personal computer 1 of the battery pack 2, thereby making it possible to eliminate the B-IN terminal which was conventionally required to serve as a detection terminal for insertion or removal of the battery.

In the configuration of this electronic equipment, it is preferable to carry out detection of the electric loading state and non-loading state of the battery pack 2 by a change of the signal level of the data line or clock line in a manner of state classification as described below in a more practical sense.

As the initial state at the time of detection of loading state, it is classified into the following three cases.
(1) The case where the notebook personal computer 1 is supplied with power from the AC adapter 14 or the battery pack 2, etc., and communication of the notebook personal computer 1 is in a standby state.
(2) The case where the notebook personal computer 1 is supplied with power from the AC adapter 14 or the battery pack 2, etc., and the notebook personal computer 1 is in a communicating state.
(3) The case where the notebook personal computer 1 is not supplied with power from the AC adapter 14 or the battery pack 2, etc.

The above-described respective states (1), (2), (3) will now be explained with reference to the Table 1 and FIG. 3.

TABLE 1

| | STATE OF BATTERY PACK | INSERTION (LOADING) | TAKING OUT |
|---|---|---|---|
| (A) | STATE (1) COMMUNICATION STANDBY AT TIME OF POWER SUPPLY | DATA LINE: H → H → H CLOCK LINE: L H → L | |
| (B) | STATE (2) POWER SUPPLY COMMUNICATING SATE | DATA LINE: H → H/L → H CLOCK LINE: L→ H/L → L | |
| (C) | STATE (3) NO POWER SUPPLY | DATA LINE: H → H → H CLOCK LINE: L → H → L | |

State (1)

Since the notebook personal computer 1 is already supplied with power from the battery pack 2 as indicated by (A) of the Table 1, the 5V power supply line 1a is held at 5V. For this reason, at the time of communication standby, in the case where both signal levels of the data line 3f and the clock line 3g are at the H level (5V), when the battery pack 2 is electrically inserted into the connecting portion 3, the signal level of the data line 3f is not changed and remains at the H level, but the signal level of the clock line 3g changes from the L level to the H level. If this change is detected, the CPU 2f of the battery pack 2 judges that the battery pack 2 has been electrically inserted.

In the case where the battery pack 2 is taken out from the notebook personal computer 1 the signal levels of the data line 3f and the clock line 3g of the battery pack 2 are respectively at the H level and the L level. Accordingly, when it is detected that the signal level of the data line 3f is at the H level and the signal level of the clock line 3g is at the L level for a predetermined time or more, the battery pack 2 judges that it has been taken out.

State (2)

In the case where the notebook personal computer 1 is communicating as indicated by (B) of the Table 1, signal levels of the data line 3h and the clock line 3i of the notebook personal computer 1 momentarily change from the L level to the H level and from the H level to the L level (indicated by H/L in the Table). Accordingly, if, when the battery pack 2 is inserted, the signal level of data line 3f of the battery pack 2 changes from the H level to the L level and the signal level of the clock line 3g changes from the L level to the H level, the CPU 2f of the battery pack 2 judges by this change that the battery pack 2 has been inserted.

In the case where the battery pack 2 is taken out of the notebook personal computer 1, signal levels of the data line 3f and the clock line 3g of the battery pack 2 are respectively caused to be at the H level and the L level. Accordingly, if the signal level of the data line is at the H level and the signal level of the clock line is at the L level for a predetermined time or longer, the CPU 2f of the battery pack 2 judges that the battery pack 2 has been taken out.

State (3)

When the battery pack 2 is inserted into the notebook personal computer 1 as indicated by (C) of the Table 1, the 5V power supply line 1a and the ground line 10 are connected through the pull-up resistor 2b, pull-up resistor 1b, pull-up resistor 1c, and the pull-down resistor 2c. If the pull-up resistor 2b is selected so that its resistance value is sufficiently larger than that of the pull-up resistor 1b and the pull-up resistor 1c and the pull-down resistor 2c is selected so that its resistance value is equal to 10 times larger than that of the pull-up resistor 2b, signal levels of the data line 3f and the clock line 3g are caused to be at the H level. In this case, the signal level of the data line 3f is not changed in the state remaining at the H level, but signal level of the clock line 3g changes from the L level to the H level. For this reason, insertion of the battery pack 2 can be judged.

In the case where the battery pack 2 is taken out of the notebook personal computer 1 in a manner opposite to the above, signal levels of the data line 3f and the clock line 3g of the battery pack 2 are respectively caused to be at the H level and the L level. Accordingly, if it is detected that the signal level of the data line 3f is at the H level and the signal level of the clock line 3g is at the L level for a predetermined time or longer, the CPU 2f of the battery pack 2 judges that the battery pack 2 has been taken out.

Another embodiment of the electronic equipment of this invention will now be described with reference to FIG. 3.

In FIG. 3, the impedance of the 5V power supply line 1a of the notebook personal computer 1 is caused to be high, the data line 3h of the battery pack 2 is pulled up by the pull-up resistor (Rp11) (e.g., 1MΩ) 2b so that the potential of the 5V power supply line 2a is provided, and the clock line 3g is pulled down by the pull-down resistor (Rp21) (e.g., 100 kΩ) 2c so that the potential of the ground line 10 is provided.

The resistance value (e.g., 100 kΩ) of this pull-down resistor (Rp21) 2c is lower as compared to the resistance value (e.g., 10 MΩ) of the pull-down resistor Rp21 in the above-described embodiment, and has a value which is about one/tenth greater than the resistance value (e.g., 1 MΩ) of the pull-up resistor (Rp11) 2b of the data line 3h. In the state where battery pack 2 is inserted into the notebook personal computer 1, the impedance of the 5V power supply line 1a is caused to correspond to low impedance.

In this configuration, by a change of the signal level of the data line or clock line, the battery pack 2 carries out detection of loading states (1), (2), (3) as indicated by the following Table 2.

TABLE 2

| | STATE OF BATTERY PACK | INSERTION (LOADING) | TAKING OUT |
|---|---|---|---|
| (A) | STATE (1) COMMUNICATION STANDBY AT TIME OF POWER SUPPLY | DATA LINE: H → H → H CLOCK LINE: L → H → L | |
| (B) | STATE (2) POWER SUPPLY COMMUNICATING STATE | DATA LINE: H → H/L → H CLOCK LINE: L → H/L → L | |
| (C) | STATE (3) NO POWER SUPPLY | DATA LINE: H → L → H CLOCK LINE: L → L → L | |

State (1)

This state is the same as the state (1) of (A) of the Table 1.

State (2)

This state is the same as the state (2) of (B) of the Table 1.

State (3)

When the battery pack 2 of FIG. 3 is inserted into the notebook personal computer 1 as indicated by (C) of the Table 1, the 5V power supply line 1a and the ground line 10 are connected through the pull-up resistor 2b, pull-up resistor 1b, pull-up resistor 1c, and the pull-down resistor 2c. The pull-up resistor 2b is selected so that its resistance value is sufficiently greater than that of the pull-up resistor 1b and the pull-up resistor 1c, and the pull-down resistor 2c is selected so that its resistance value is a value about 1/10 times greater than that of the pull-up resistor 2b. For this reason, signal levels of the data line 3f and the clock line 3g are caused to be at the L level. The signal level of the clock line 3g is not changed and remains at the L level. However, since the signal level of the data line changes from H to L, insertion of the battery pack 2 can be judged by this change.

In the case where the battery pack 2 is taken out of the notebook personal computer 1, the signal levels of the data line 3f and the clock line 3g of the battery pack 2 are respectively caused to be at the H level and the L level. Accordingly, if it is detected that the signal level of the data line 3f is at the H level and the signal level of the clock line 3g is at the L level for a predetermined time or longer, the CPU 2f of the battery pack 2 judges that the battery pack 2 has been taken out.

Moreover, by also employing, in place of the configuration of FIG. 3, an approach in which the impedance of the 5V power supply line of the notebook personal computer is caused to be low (e.g., a resistor of 100 kΩ is inserted between the 5V power supply line and the ground line), and the impedance of the pull-down resistor Rp21 of the clock line of the battery pack is caused to be value about 10 times greater than that of the pull-up resistor Rp11 of data line, it is possible to detect the loading state by a similar operation.

In this case, in the above-described embodiment shown in FIG. 3, the data line 3f of the CPU 2f of the battery pack 2 is connected to the 5V power supply line 2a through the pull-up resistor (Rp11) 2b, and the clock line 3g is connected to the ground line (GND) 10 through the pull-down resistor (Rp21). In a manner opposite to the above, namely, the data line 3f may be connected to the ground line through the pull-down resistor, and the clock line 3g may be connected to the 5V power supply line through the pull-up resistor. In this case, loading detection of the battery pack can be similarly carried out except that the signal state of data line in the Table 1 and the Table 2 and the signal state of clock line are opposite to each other.

A further embodiment of the electronic equipment of this invention will now be described with reference to FIG. 4 and the Table 3.

Figure 4:
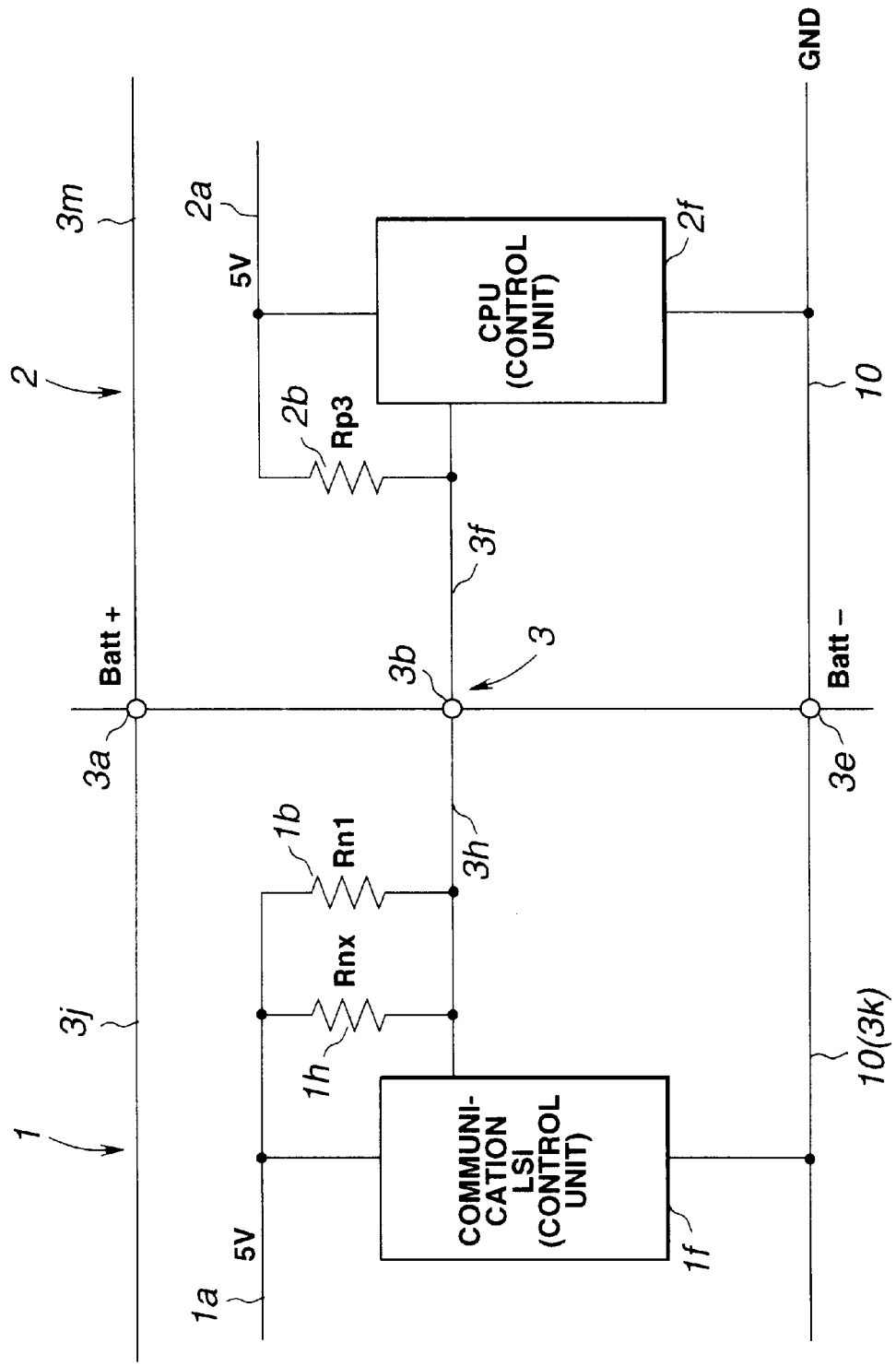
FIG. 4 is an electrical diagram showing another embodiment of this invention.

In FIG. 4, the notebook personal computer 1 includes a resistor (Rnx) 1h, pull-up resistor (Rn1) 1b, and an LSI circuit 1f for communication, etc. One respective end of the resistor 1h and the pull-up resistor 1b are connected to the 5V power supply line 1a, and the other end of the resistor 1h and resistor 1b are connected to the communication LSI circuit 1f. The control LSI 1f is also connected to the ground line 10 (called the battery line 3k as occasion may demand). The other end of the pull-up resistor 1b is connected to the data line 3h of communication LSI 1f, and this data line 3h is connected to the data terminal 3b. The battery line 3j is connected to the battery terminal 3a, and the ground line 10 (battery line 3k) is connected to the battery terminal 3e.

The connecting portion 3 has only three terminals in total including the battery terminals 3a, 3e and the data terminal 3b.

On the other hand, the battery pack 2 includes the pull-up resistor (Rp11) 2b and CPU 2f, and the 5V power supply line 2a is connected at one end of the pull-up resistor 2b. The other end of the pull-up resistor 2b is connected to the data line 3f of the CPU 2f. The other end of the CPU 2f is connected to the ground line 10.

As stated above, in the embodiment of the electronic equipment of FIG. 4, the connecting portion 3 includes three terminals 3a to 3e, and the communication LSI 1f and the CPU 2f include only data lines 3h, 3f and does not have a clock line. Namely, the electronic equipment of FIG. 4 employs the so-called one wire type communication system, but is different in that the embodiment of FIG. 3 employs so-called two-wire type communication system having the data line and the clock line.

In FIG. 4, the resistor Rnx (e.g., 100 kΩ) is inserted between the 5V power supply line 1a and the ground line 10 to allow the impedance of the 5V power supply line 1a of the notebook personal computer 1 to be a low impedance, and to the pull-up data line 3f of the battery pack 2 by the pull-up resistor (e.g., 1 MΩ) 2b so that the potential of the 5V power supply line 2a is provided.

In the configuration shown in FIG. 4, the battery pack 2 carries out detection of the loading state by a change of the signal level of the data line 3f in a manner as shown in the Table 3.

TABLE 3

| STATE OF BATTERY PACK | | INSERTION (LOADING) TAKING OUT |
|---|---|---|
| (A) | STATE (1) COMMUNICATION STANDBY AT TIME OF POWER SUPPLY | DATA LINE: H → L → H |
| (B) | STATE (2) POWER SUPPLY COMMUNICATING STATE | DATA LINE: H → H/L → H |
| (C) | STATE (3) NO POWER SUPPLY | DATA LINE: H → L → H |

State (1)

The data signal at the time of the communication standby state of the notebook personal computer 1 is assumed to be at the L level as indicated by (A) of the Table 3. Thus, when the battery pack 2 is inserted into the notebook personal computer 1, the signal level of data line 3f of battery pack 2 changes from the H level to the L level. In this case, by this change, the CPU 2f of the battery pack 2 judges that the battery pack 2 has been inserted.

In the case where the battery pack 2 is taken out from the notebook personal computer 1, the signal level of the data line 3f of the battery pack 2 is caused to be at the H level. Accordingly, if the CPU 2f of the battery pack 2 detects that the signal level of the data line 3f is caused to be at the H level for a predetermined time or longer, it judges that the battery pack 2 has been taken out.

State (2)

In the case where the notebook personal computer 1 is communicating as indicated by (B) of the Table 3, the signal level of that data line 3f changes (H/L) from the H level to the L level, or from the L level to the H level. For this reason, when the battery pack 2 is inserted, there are instances where signal level of data line 3f of battery pack 2 changes from the H level to the L level. The CPU 2f detects this change to thereby detect that the battery pack 2 has been inserted.

In the case where the battery pack 2 is taken out from the notebook personal computer 1, the signal level of the data line 3f of the battery pack 2 is caused to be at the H level. Accordingly, if it is detected that the signal level of the data line 3f is caused to be at the H level for a predetermined time or longer, the battery pack judges that it has been taken out.

State (3)

When the battery pack 2 is inserted into the notebook personal computer 1 as indicated by (C) of FIG. 3, the 5V power supply line 2a and the ground line 10 of the battery pack 2 are connected by the pull-up resistor 2b and the resistor Rnx. For this reason, when the pull-up resistor 2b is selected so that its resistance value is sufficiently greater than that of the resistor Rnx, the signal level of the data line 3f changes from the H level to the L level as the result of the fact that the battery pack 2 is inserted. By this change, the CPU 2f of the battery pack 2 can judge that the battery pack 2 has been inserted.

In accordance with the embodiment of this invention, it becomes possible to detect electrically the insertion and removal with respect to the notebook personal computer 1 of the battery pack 2 by the communication line. As a result, the necessity of providing a dedicated terminal for detecting the loading state which is conventionally required is eliminated. Thus, the number of terminals can be reduced, and miniaturization of connector can be realized and there can result less unsatisfactory contact.

It is to be noted that, similarly to the prior art, the battery pack 2 detects the loading state to thereby control the supply of power from the battery pack 2 to the notebook personal computer 1, or to carry out charge/discharge control.

Specifically, in the case where, for the purpose of reducing current consumption, the battery pack 2 is not loaded into the notebook personal computer 1 or the notebook personal computer 1 is in a sleep state even if the battery is loaded, the supply of power to a portion of the circuit within the battery pack 2 is interrupted to reduce current consumption.

A difference in the charge/discharge operation of the battery pack 2 is effected by the loading state, when the battery pack 2 is not loaded, it inhibits the charge/discharge operation, but when the battery pack 2 is loaded, if the battery pack 2 is in the normal state, the charge/discharge operation can be made.

Detection that the notebook personal computer 1 is in the sleep state during loading is carried out by allowing the CPU 2f of the battery pack 2 to detect that the signal level of the communication line is not changed for a predetermined time or more.

The battery pack 2 applies a latch for overcurrent protection so that the charge/discharge operation cannot be performed in the case where overcurrent is detected, the latch for overcurrent protection is released when the battery is taken out of the notebook personal computer 1.

Further, the battery pack 2 does not supply power to the notebook personal computer 1 until the battery pack 2 is loaded (chargeable/dischargeable state). In addition, in the case where the battery pack 2 is taken out, the charge/discharge operation is not inhibited until the battery pack 2 recognizes that it has been taken out except for the extraordinary state such as overcurrent, overdischarge or overcharge, etc.

Control of such charge/discharge operation is carried out by allowing the CPU 2f of the battery pack 2 of FIG. 3 to carry out ON/OFF control of FETs 31 and 32 through control lines 41 and 42 and through drivers 35 and 36. In addition, in the case where the power supply from the battery pack 2 to the notebook personal computer 1 is not carried out, the CPU 2f sends a power saving control signal to the switch 26 through the control line 43 to cut OFF the power supply to the multiplexer 22 and the operational amplifiers 23 and 25 to thereby carry out a control such that there results the power saving state.

A further embodiment of the electronic equipment of this invention will now be described with reference to FIG. 5.

Figure 5:
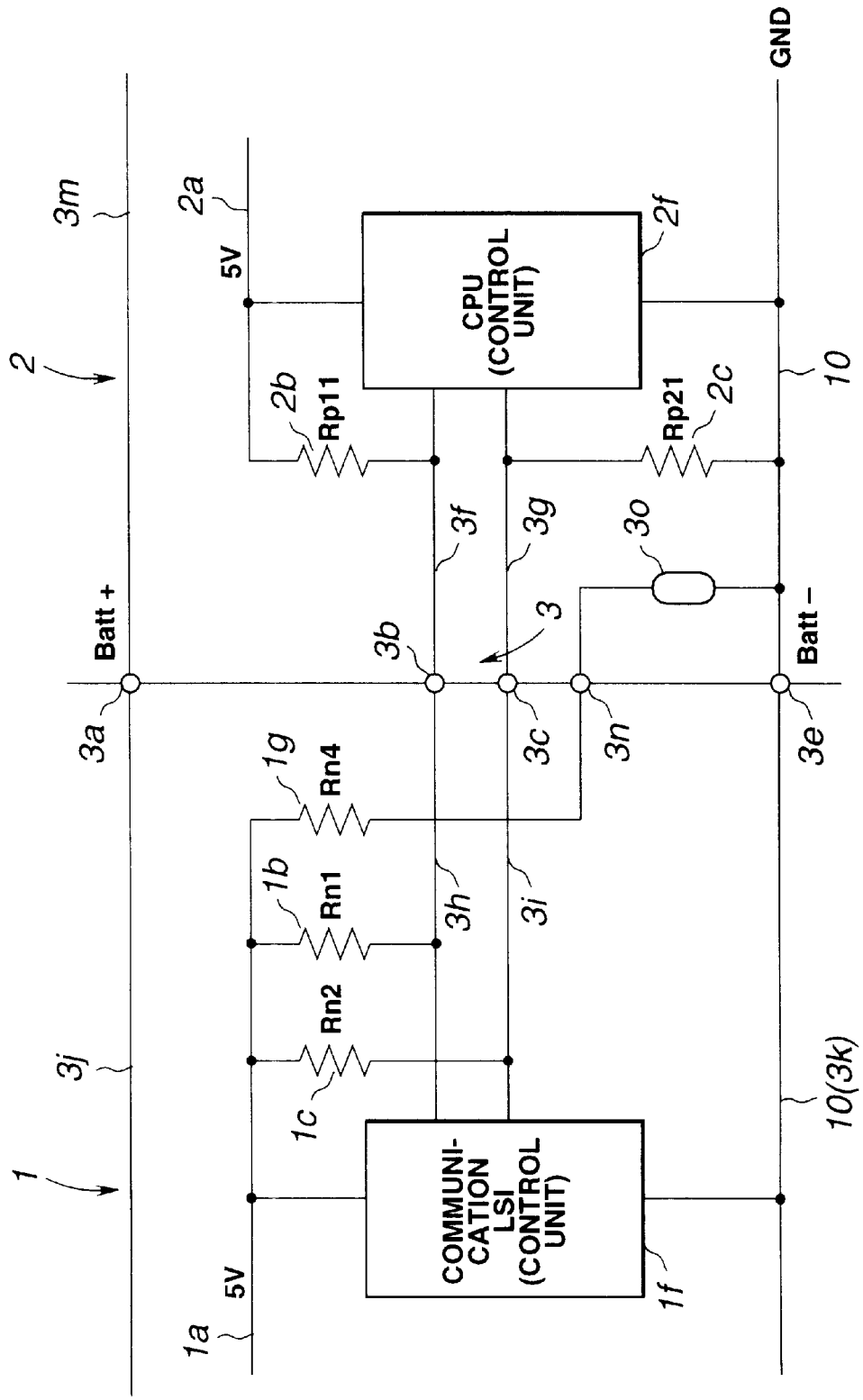
FIG. 5 is an electrical diagram showing a further embodiment of this invention.

The embodiment of FIG. 5 is substantially similar to the embodiment of FIG. 3, but a thermistor 30 for temperature compensation is provided in addition to the embodiment of FIG. 3. This thermistor 30 is disposed between the 5V power supply line 1a and the ground line 10 of the notebook personal computer 1 through a resistor 1g and a terminal 3n.

In the configuration of FIG. 3, in the case where the pull-down resistor (Rp21) 2c is provided, e.g., the pull-down resistor of the embodiment having relatively low impedance of about 100 kΩ, the signal level is dropped with respect to the ground 10 through the clock line 3i, clock line 3g and the pull-down resistor (Rp21) 2c from the data line 3h of the communication LSI circuit 1f, whereby the signal level of the data terminal 3b changes from the H level to the L level.

On the contrary, in the embodiment of FIG. 5, the data line 3f is pulled down with respect to the ground 10 through the resistor (Rn3) 1g, terminal 3n and the thermistor 30. Thus, when the battery pack 2 is loaded into the notebook personal computer 1, the signal level of the power supply line 1a changes from the H level to the L level. For this reason, the CPU 2f of the battery pack 2 detects the change of the signal level (a change from the H level to the L level) of the data line 3f, thereby making it possible to detect that the battery pack 2 has been inserted into the notebook personal computer 1.

As explained above, in accordance with the embodiment of this invention, the number of connection terminals used in electrically connecting the battery pack with respect to the electronic equipment is reduced. Thus, it is possible to realize miniaturization and avoid unsatisfactory terminal contact.

Namely, in the embodiments of this invention, the B-IN terminal which was conventionally required can be eliminated, and miniaturization of the connector by reduction in the number of terminals can be realized and there can result more reliable contact of the terminal.

This invention is not limited to the above-mentioned embodiments.

While the example of the so-called notebook personal computer is mentioned as the electronic equipment in the above-described embodiments, this invention is not limited to such implementation. This invention is not limited to notebook personal computers, but may be utilized in equipment for which the supply of power is required by a battery pack. Thus, this invention can be applied to other kinds of computers, information terminals, sound recorders, video tape recorders, portable telephones, electric bicycles and other equipment for which a battery pack is required.

Although other modifications and changes may be suggested by those skilled in the art, it is the intention of the inventor to embody within the patent warranted hereon all changes and modifications as reasonably and properly come within the scope of their contribution to the art.

What is claimed is:

1. A battery pack adapted to be detachably loaded through an electric connection portion with respect to an electronic equipment to thereby carry out power supply to the electronic equipment, comprising:

a communication line for carrying out transmission/reception of information between the battery pack and the electronic equipment used to detect whether the battery pack is in a state electrically connected to the connecting portion of the electronic equipment or in a state electrically taken out from the connecting portion of the electronic equipment, wherein the communication line includes a data line for carrying out transmission/reception of data between the battery pack and the electronic equipment and a clock line supplied with a clock signal from the electronic equipment to detect, on a basis of combination of states of signals on the data line and the clock line, whether the battery pack is in the state electrically connected to the connecting portion of the electronic equipment or in the state electrically detached from the connecting portion of the electronic equipment.

2. A battery pack as set forth in claim 1, wherein whether the battery pack is in the state electrically connected to the connecting portion of the electronic equipment or in the state electrically detached from the connecting portion of the electronic equipment is detected depending upon presence or absence of a signal on the data line or the clock line when the electronic equipment is supplied with power and communication is being carried out between the battery pack and the electronic equipment.

3. A battery pack as set forth in claim 1, wherein whether the battery pack is in the state electrically connected to the connecting portion of the electronic equipment or in the state electrically detached from the connecting portion of the electronic equipment is detected on a basis of a change of a signal level of the clock line or the data line at a time of a first state where power supply line connected to the data line and the clock line of the electronic equipment is caused to have high impedance, the electronic equipment is supplied with power and communication is not carried out between the battery pack and the electronic equipment, a change of the signal level of the data line or the clock line at the time of a second state where the electronic equipment is supplied with power and communication is being carried out between the battery pack and the electronic equipment, and change of a signal level of the clock line or the data line at the time of a third state where the electronic equipment is not supplied with power.

4. A battery pack as set forth in claim 1, wherein whether the battery pack is in the state electrically connected to the connecting portion of the electronic equipment or in the state electrically detached from the connecting portion of the electronic equipment is detected on a basis of a change of the signal level of the clock line or the data line at the time of a first state where power supply line connected to the data line and the clock line of the electronic equipment is caused to have low impedance, and the electronic equipment is supplied with power and communication is not carried out between the battery pack and the electronic equipment, a change of the signal level of the data line or the clock line at the time of a second state where the electronic equipment is supplied with power and communication is being carried out between the battery pack and the electronic equipment, and a change of the signal level of the data line or the clock line at the time of a third state where the electronic equipment is not supplied with power.

5. A battery pack as set forth in claim 1, wherein whether the battery pack in the state electrically connected to the connecting portion of the electronic equipment or in the state electrically detached from the connecting portion of the electronic equipment is detected on a basis of a change of the signal level of the clock line or the data line at the time of a first state where power supply line of the electronic equipment is caused to have low impedance at the time of loading of the battery pack, and the electronic equipment is supplied with power and communication is not carried out between the battery pack and the electronic equipment, a change of the signal level of the data line or the clock line at the time of a second state where the electronic equipment is supplied with power and communication is being carried out between the battery pack and the electronic equipment, and a change of the signal level of the data line or the clock line at the time of a third state where the electronic equipment is not supplied with power.

6. A battery pack as set forth in claim 1, wherein the communication line includes a data line for carrying out transmission/reception of data between the battery pack and the electronic equipment to detect, on a basis of the state of a signal on the data line, whether the battery pack is in the state electrically connected to the connecting portion of the electronic equipment or in the state electrically detached from the connecting portion of the electronic equipment.

7. A battery pack as set forth in claim 6, wherein whether the battery pack is in the state electrically connected to the connecting portion of the electronic equipment or in the state electrically detached from the connecting portion of the electronic equipment is detected depending upon presence or absence of a signal on the data line when the electronic equipment is supplied with power and communication is being carried out between the battery pack and the electronic equipment.

8. A battery pack as set forth in claim 6, wherein whether the battery pack is in the state electrically connected to the connecting portion of the electronic equipment or in the state electrically detached from the connecting portion of the electronic equipment is detected on a basis of a change of a signal level of the data line at the time of a first state where the electronic equipment is supplied with power and communication is not carried out between the battery pack and the electronic equipment, change of signal level of the data line at a time of a second state where the electronic equipment is supplied with power and communication is being carried out between the battery pack and the electronic equipment, and a change of a signal level of the data line at the time of a third state where the electronic equipment is not supplied with power.

9. An electronic equipment system, comprising:
a battery pack and an electronic equipment in which the battery pack is detachably loaded through an electric connecting portion so that power supply from the battery pack is carried out, wherein the battery pack detects, by using a communication line for carrying out transmission/reception of information between the battery pack and the electronic equipment, whether the battery pack is in the state electrically connected to the connecting portion of the electronic equipment or in the state electrically detached from the connecting portion of the electronic equipment.
wherein the communication line is composed of a data line disposed between the battery pack and the electronic equipment and adapted for carrying out transmission/reception of data, and a clock line disposed between the battery pack and the electronic equipment and supplied with clock therethrough, and the battery pack detects, on the basis of combination of states of signals on the data line and the clock line, whether the battery pack is in the state electrically connected to the connecting portion of the electronic equipment or in the state electrically detached from the connecting portion of the electronic equipment.

10. An electronic equipment system as set forth in claim 9, wherein the battery pack detects, depending upon presence or absence of a signal on the data line or the clock line when power is supplied from the battery pack to the electronic equipment as an initial state in electrically connecting the battery pack to the electronic equipment and communication is being carried out between the battery pack and the electronic equipment, whether the battery pack is in the state electrically connected to the connecting portion of the electronic equipment or in the state electrically taken out from the connecting portion of the electronic equipment.

11. An electronic equipment system as set forth in claim 9, wherein the battery pack detects, on a basis of change of signal level of the clock line or the data line at a time of a first state where the data line and the clock line of the electronic equipment are pulled up to a power supply line placed in the state of high impedance, power is supplied from the battery pack to the electronic equipment as an initial state in electrically connecting the battery pack to the electronic equipment and communication is not carried out between the battery pack and the electronic equipment, presence or absence of a signal on the data line or the clock line at a time of a second state where power is supplied from the battery pack to the electronic equipment and communication is being carried out between the battery pack and the electronic equipment, and change of signal level of the clock line or the data line at a time of a third state where power is not supplied from the battery pack to the electronic equipment, whether the battery pack is in the state electrically connected to the connecting portion of the electronic equipment or in the state electrically detached from the connecting portion of the electronic equipment.

12. An electronic equipment system as set forth in claim 9, wherein the battery pack detects, on a basis of a change of a signal level of the clock line or the data line at a time of a first state where the data line and the clock line of the electronic equipment are pulled up to a power supply line placed in a state of low impedance, and power is supplied from the battery pack to the electronic equipment as an initial state in electrically connecting the battery pack to the electronic equipment and communication is not carried out between the battery pack and the electronic equipment, presence or absence of a signal on the data line or the clock line at the time of a second state where power is supplied from the battery pack to the electronic equipment and communication is being carried out between the battery pack and the electronic equipment, and change of signal level of the data line or the clock line at the time of a third state where power is not supplied from the battery pack to the electronic equipment, whether the battery pack is in the state electrically connected to the connecting portion of the electronic equipment or in the state electrically detached from the connecting portion of the electronic equipment.

13. An electronic equipment system as set forth in claim 9, wherein the battery pack detects, on a basis of a change of a signal level of the clock line or the data line at a time of a first state where power supply line connected to the data line and the clock line of the electronic equipment is caused to have low impedance at a time of loading of the battery pack, and power is supplied from the battery pack to the electronic equipment as a initial state in electrically connecting the battery pack to the electronic equipment and communication is not carried out between the battery pack and the electronic equipment, presence or absence of a signal on the data line or the clock line at the time of a second state where power is supplied from the battery pack to the electronic equipment and communication is being carried out between the battery pack and the electronic equipment, and change of signal level of the data line or the clock line at a time of a third state where power is not supplied from the battery pack to the electronic equipment, whether the battery pack is in the state electrically connected to the connecting portion of the electronic equipment or in the state electrically detached from the connecting portion of the electronic equipment.

14. An electronic equipment system as set forth in claim 9, wherein the communication line is disposed between the battery pack and the electronic equipment and comprised of a data line for carrying out transmission/reception of data to detect, on a basis of a state of a signal on the data line, whether the battery pack is in the state electrically connected to the connecting portion of the electronic equipment or in the state electrically detached from the connecting portion of the electronic equipment.

15. An electronic equipment system as set forth in claim 14, wherein the battery pack detects, in accordance with presence or absence of a signal on the data line when power is supplied from the battery pack to the electronic equipment as an initial state in electrically connecting the battery pack to the electronic equipment and communication is being carried out between the battery pack and the electronic equipment, whether the battery pack is in the state electrically connected to the connecting portion of the electronic equipment or in the state electrically detached from the connecting portion of the electronic equipment.

16. An electronic equipment system as set forth in claim 14, wherein the battery pack detects, on a basis of change of signal level of the data line at a time of a first state where power is supplied from the battery pack to the electronic equipment as an initial state in electrically connecting the battery pack to the electronic equipment and communication is not carried out between the battery pack and the electronic equipment, presence or absence of a signal on the data line at the time of a second state where power is supplied from the battery pack to the electronic equipment and communication is being carried out between the battery pack and the electronic equipment, and a change of a signal level of the data line at the time of a third state where no power is supplied from the battery pack to the electronic equipment, whether the battery pack is in the state electrically connected to the connecting portion of the electronic equipment or in the state electrically detached from the connecting portion of the electronic equipment.

17. A loading detection method for battery pack, which is adapted to detachably carry out loading of a battery pack through an electric connecting portion with respect to an electronic equipment to thereby carry out power supply to the electronic equipment, wherein the battery pack detects, by using a communication line for carrying out transmission/reception of information between the battery pack and the electronic equipment, whether the battery pack is in the state electrically connected to the connecting portion of the electronic equipment, or in the state electrically detached from the connecting portion of the electronic equipment, wherein the communication line is composed of a data line for carrying out transmission/reception of data between the battery pack and the electronic equipment and a clock line supplied with clock from the electronic equipment to detect, on a basis of a combination of states of signals on the data line and the clock line, whether the battery pack is in the state electrically connected to the connecting portion of the electronic equipment or in the state electrically detached from the connecting portion of the electronic equipment.

18. A loading detection method for battery pack as set forth in claim 17, wherein the communication line is comprised of a data line for carrying out transmission/reception of data between the battery pack and the electronic equipment to detect, on a basis of a state of a signal on the data line, whether the battery pack is in the state electrically connected to the connecting portion of the electronic equipment or in the state electrically detached from the connecting portion of the electronic equipment.

* * * * *